Sept. 23, 1924.　　　　　　　　　　　　　　　　1,509,466
A. B. BEITMAN
SPRING SHACKLE LUBRICATOR AND COVER
Filed Dec. 6, 1920
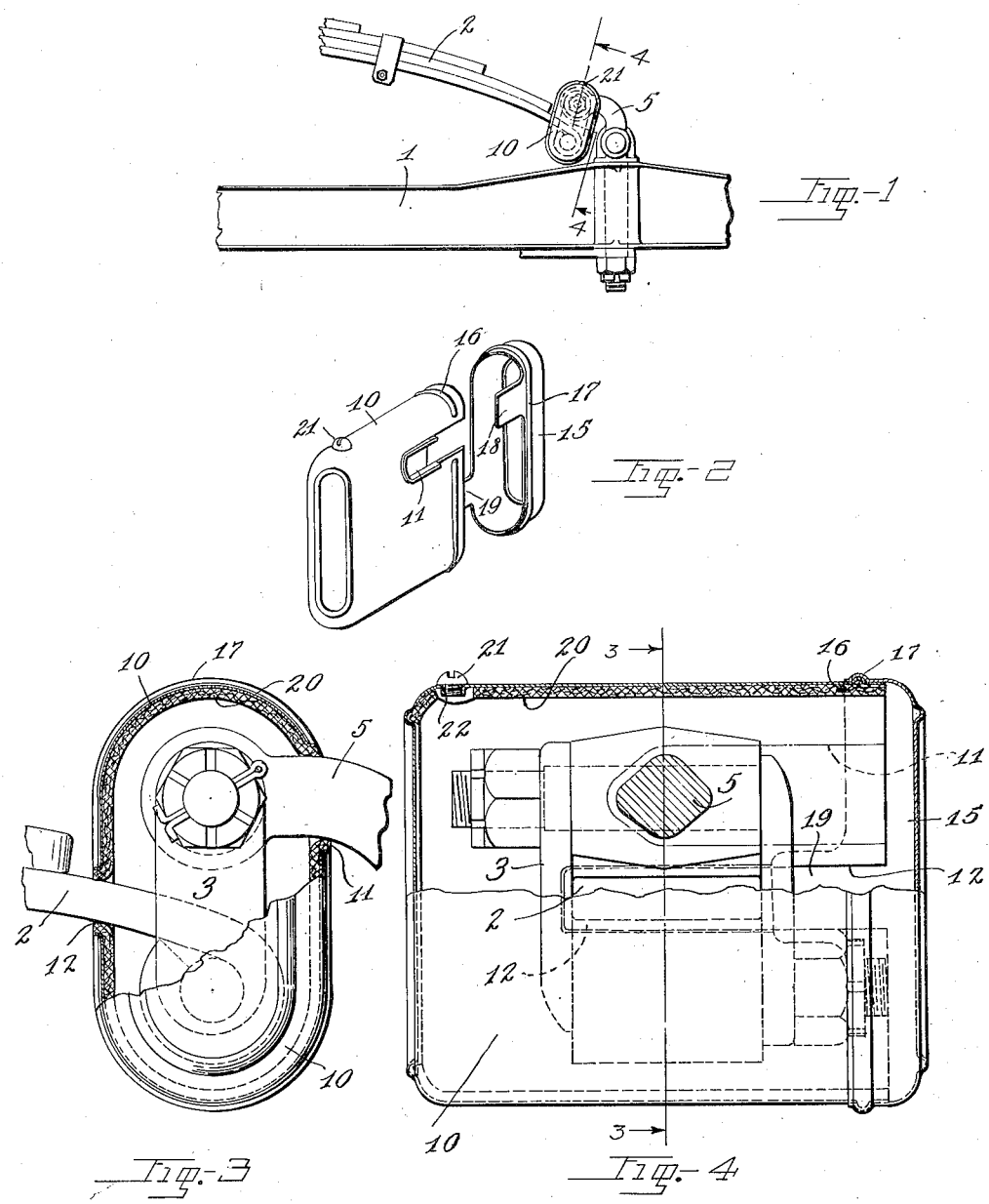
Inventor
Albert B. Beitman
By Hull, Smith, Brock & West
Attys Patented Sept. 23, 1924.

1,509,466

UNITED STATES PATENT OFFICE.

ALBERT B. BEITMAN, OF CLEVELAND HEIGHTS, OHIO.

SPRING-SHACKLE LUBRICATOR AND COVER.

Application filed December 6, 1920. Serial No. 428,467.

*To all whom it may concern:*

Be it known that I, ALBERT B. BEITMAN, a citizen of the United States, residing at Cleveland Heights, in the county of Cuyahoga and State of Ohio, have invented a certain new and useful Improvement in Spring-Shackle Lubricators and Covers, of which the following is a full, clear, and exact description, reference being had to the accompanying drawings.

This invention relates to vehicle spring lubrication and protection, and has to do more particularly with a casing for enclosing the spring shackle and for containing a quantity of oil or grease for lubricating the shackle bolts.

The objects of the invention are to provide a simple and inexpensive casing that may be quickly and conveniently applied to the spring shackle and thoroughly enclose the same against the ingress of dust and grit and the egress of oil or grease; the provision of a device of the aforesaid character that may be applied to the spring shackle without the use of tools; which is very durable; which is neat of appearance; and which does not require frequent attention, it being intended that when a set of these devices is used upon a vehicle and supplied with the proper quantity of lubricant, that the spring shackles will require no further attention during a season's running except, possibly, to introduce into the casing a little oil from time to time to replenish the supply or soften the grease in the event that the same becomes hard from low temperatures or other causes. It is a further object to provide the casing with means whereby it may be supplied with oil without the need of disassembling the casing for such purpose.

The foregoing objects, and others which will become apparent as this description proceeds, are attained in the construction illustrated in the drawing accompanying and forming a part hereof and wherein Fig. 1 is a fragmentary elevational view of the spring and axle of a vehicle, with my casing enclosing the shackle which connects the spring to the axle; Fig. 2 is a perspective view of the casing members separated; Fig. 3 is a sectional end elevation of the casing applied to the vehicle parts, the plane of the sectional portion of said view being indicated by the line 3—3 of Fig. 4; and Fig. 4 is a similar view, at right angles to Fig. 3, taken as though looking from the right thereof.

In the drawing, 1 represents the axle and 2 the spring of a well-known type of vehicle, the free end of the spring being connected through the shackle 3 with a horn c bracket 5 that is supported by the axle.

The casing comprises a member 10 of a size and shape to receive within it the shackle 3, and the sides of the member 10 are slotted at 11 and 12 for the passage of the end of the spring 2, and the horn or bracket 5. It will be noted, particularly by reference to Fig. 3, that the material whereof the member 10 is formed is flanged outwardly about the slots 11 and 12, the flanges being spaced somewhat from the parts which extend through the slots. A cover 15 is designed for application to the open end of the casing member 10, and it is arranged to be held thereon by the interlocking of a bead 16 of the member 10 with a bead 17 of the cover. The cover has extensions 18 and 19 which close the open ends of the respective slots 11 and 12, when the casing parts are together.

A lining 20 of felt or other absorbent material is shown as extending about the interior of the casing member 10 and as projecting through the slots 11 and 12 so as to close the joints between the casing and the spring 2 and bracket 5. This lining serves not only to close said joints, but in the event the casing is only partially filled with oil, to convey the oil up the sides of the casing and to the parts entering said slots so that by capillary attraction it may pass along such parts to the shackle bolts.

The casing may be filled with either grease or oil, and when the oil supply becomes depleted through any cause, it may be replenished by removing the screw plug 21 which closes an opening 22 in the top of the casing member 10 and introducing through said opening a fresh supply. And in the event that grease is used in the casing, and the same becomes hard, oil may be supplied as above described for the purpose of softening the grease.

Having thus described my invention, what I claim is:

1. As a new article of manufacture, a lubricant-containing casing designed to enclose a spring shackle and arranged to admit the shackle support and the end of the vehicle spring, the said casing being free to swing with the shackle.

2. As a new article of manufacture, a lubricant-containing casing enclosing and conforming substantially to the shape of a spring shackle and arranged to admit the shackle support and the end of the vehicle spring, said casing being free to swing with the shackle.

3. In combination with a vehicle spring, an element, and means pivotally connecting the end of the spring to said element, a casing enclosing the pivotal means and the adjacent portions of the spring and element, said casing having a peripheral wall provided with openings through which the spring end and said element extend.

4. A device of the character set forth comprising opposed casing members designed to interfit with each other and enclose a spring shackle, one of said members having slots for the passage of the shackle support and the end of the spring.

5. A device of the character set forth comprising opposed casing members designed to interfit with each other and enclose a spring shackle, one of said members having slots for the passage of the shackle support and the end of the spring, and the other having extensions which close the open ends of the aforesaid slots.

6. A device of the character set forth comprising a lubricant-containing casing designed to enclose a spring shackle and arranged to admit the shackle support and end of the vehicle spring, and absorbent material within the casing.

7. A device of the character set forth comprising a metallic lubricant-containing casing designed to enclose a spring shackle, the casing having openings for the passage of the shackle support and the end of the vehicle spring, and absorbent material within the casing and closing the joints between the casing and said support and spring.

8. A device of the character set forth comprising a metallic lubricant-containing casing designed to enclose a spring shackle, the casing having openings for the passage of the shackle support and the end of the vehicle spring, and absorbent material within the casing and extending upwardly from the lower portion thereof and contacting with said support and spring.

9. A device of the character set forth comprising opposed casing members designed to enclose a spring shackle, the casing members having beads which interengage for holding the members together.

10. A device of the character set forth comprising an open-ended casing member adapted to be applied to a spring shackle and having open-ended slots which extend inward from the open-end of the casing for the accommodation of the shackle support and spring end; the casing having a bead adjacent its open end, and a cover for application to the open end of the casing, said cover having a bead cooperating with the bead of the casing for holding it in place and being provided with extensions which close the portions of the aforesaid slots not occupied by the shackle support and spring.

In testimony whereof, I hereunto affix my signature.

ALBERT B. BEITMAN.